United States Patent
Bircann et al.

(10) Patent No.: US 6,543,746 B2
(45) Date of Patent: Apr. 8, 2003

(54) SHAFT LEAKAGE CONTAINMENT SYSTEM FOR A GAS CONTROL VALVE

(75) Inventors: Raul A. Bircann, Penfield, NY (US); Dwight O. Palmer, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 24 days.

(21) Appl. No.: 09/790,271

(22) Filed: Feb. 21, 2001

(65) Prior Publication Data

US 2002/0113222 A1 Aug. 22, 2002

(51) Int. Cl.⁷ ............................................. F16K 31/44
(52) U.S. Cl. .............. 251/214; 251/129.15; 251/129.17
(58) Field of Search ........................... 251/214, 129.15, 251/129.17

(56) References Cited

U.S. PATENT DOCUMENTS

| | | | | |
|---|---|---|---|---|
| 2,755,059 A | * | 7/1956 | Auwarter | 137/556 |
| 4,121,843 A | * | 10/1978 | Halling | 277/647 |
| 4,199,951 A | * | 4/1980 | Horie | 60/281 |
| 4,722,548 A | * | 2/1988 | Hamilton et al. | 188/284 |
| 5,172,722 A | * | 12/1992 | Nishimura | 137/599.16 |
| 5,346,098 A | * | 9/1994 | King et al. | 222/146.5 |
| 5,405,336 A | * | 4/1995 | Austin et al. | 604/534 |
| 5,472,142 A | * | 12/1995 | Iwanaga | 239/533.4 |
| 5,924,672 A | * | 7/1999 | Crochet et al. | 105/377.07 |
| 6,062,536 A | * | 5/2000 | Bircann | 251/129.15 |

* cited by examiner

Primary Examiner—Kevin Shaver
Assistant Examiner—David A Bonderer
(74) Attorney, Agent, or Firm—Patrick M. Griffin

(57) ABSTRACT

A system for containing leakage along a pintle shaft in a pintle-type gas control valve, such as an exhaust gas recirculation valve for an internal combustion engine or a reformate diverter valve for a fuel cell, comprising a novel seal element and means for sealing the element to the valve's pintle shaft bearing and to an interrupted pintle shaft. The system comprises two elements: a positive vapor block in the form of an elastomeric boot or folded diaphragm disposed across the pintle interruption, and a pintle shaft bearing disposable in the valve's body and sealingly secured to the boot or diaphragm. The system may include a coil spring disposed in compression within the boot or diaphragm.

8 Claims, 6 Drawing Sheets

SHAFT LEAKAGE CONTAINMENT SYSTEM FOR A GAS CONTROL VALVE

TECHNICAL FIELD

The present invention relates to shaft seals for pintle-type valves; more particularly to seals for solenoid-actuated pintle valves for metering the flow of gases; and most particularly to a gas leakage containment system including an elastomeric boot or folded diaphragm for containing gases leaked from a pintle shaft bore in the valve body, thereby preventing undesirable entry of such gases into the actuator or the atmosphere.

BACKGROUND OF THE INVENTION

It is well known to use pintle-type valves to meteringly control the flow of gases from one distributor into another. For example, in the automotive art a variable-flow control valve connecting the exhaust manifold with the intake manifold of an internal combustion engine is used to permit selective recirculation of a portion of an engine's exhaust gas into the fuel intake stream. Such recirculation is beneficial for reducing the burn temperature of the fuel mix in the engine to reduce formation of nitrogen and sulfur oxides which are significant components of smog. Such a valve is known in the art as an exhaust gas recirculation (EGR) valve. In fuel cells, a three-way pintle-type valve may be used to regulate the flow of reformate to either a waste burner or the reaction chamber.

Typically, a pintle-type gas metering valve has a valve body enclosing a chamber. In an EGR valve, this chamber is disposed between a first port in the exhaust manifold and a second port in the intake manifold; a valve seat dividing the chamber between the two ports; a pintle shaft having a valve head fitted to the valve seat and extending from the valve head through a bearing mounted in a third port in a sidewall of the valve body; a spring-retained bearing splash shield; and a solenoid actuator mounted on the exterior of the valve body and having an armature into which the outer end of the valve pintle extends. Typically, a space between the valve body and the valve actuator containing the splash shield is exposed to atmospheric conditions.

The exhaust gas managed by an EGR valve is moisture-laden, corrosive, and dirty. If this gas is allowed to enter the valve actuator, for example, by leaking along the pintle shaft, then internal corrosion, malfunction, and ultimate failure of the actuator can result. Such failure can lead to emission non-compliance and can incur significant cost to a vehicle manufacturer if a recall is required.

The gas managed by a fuel cell valve typically is hydrogen, which is very difficult to seal against because of its molecular size and which can be violently explosive in combination with oxygen. Thus, shaft leakage to the atmosphere is highly undesirable.

In pintle-type gate valves, the shafts may be sealed via well-known packing glands, through which the pintle motion is substantially rotary. Such glands are not practical in metering valves actuated by low-force solenoids in which the pintle motion is entirely axial because adequate packing would create unacceptably large frictional forces on the pintle, requiring very large and expensive actuators.

In many prior art solenoid-actuated gas control valves in use today, a compromise has been reached wherein leak rates of <0.2 grams/second are accepted, to minimize shaft frictional loading and allow low hysteresis actuation of the valve. However, ever more stringent emission regulations and the advent of fuel cells in the automotive industry make this compromise no longer acceptable. This has increased the industry need for a time-proven, cost-effective actuator and valve which can overcome the historically impossible obstacle of attaining zero leakage from the shaft.

What is needed is a gas leakage containment system disposed between a pintle-type valve and its actuator which prevents gas and/or moisture from intruding into the actuator and/or escaping to the atmosphere, without impairing efficiency, size, and performance of the valve and actuator. Preferably, such a containment system is simple and inexpensive to fabricate and install.

SUMMARY OF THE INVENTION

The present invention is directed to a shaft leakage containment system comprising a novel shaft seal for installation on an interrupted pintle shaft in a pintle-type valve, such as an exhaust gas recirculation valve for an internal combustion engine or a diverter valve for a fuel cell, for preventing leakage of gas and/or moisture along the pintle shaft into the actuator and/or the atmosphere. The system comprises two elements: a positive vapor block in the form of a sealed, impermeable, elastomeric boot or folded diaphragm disposed across the pintle shaft interruption, and means for sealingly securing the boot or diaphragm to the valve body and to the interrupted pintle shaft.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings, in which.

DESCRIPTION OF THE PREFERRED EMBODIMENT

Figure 1:
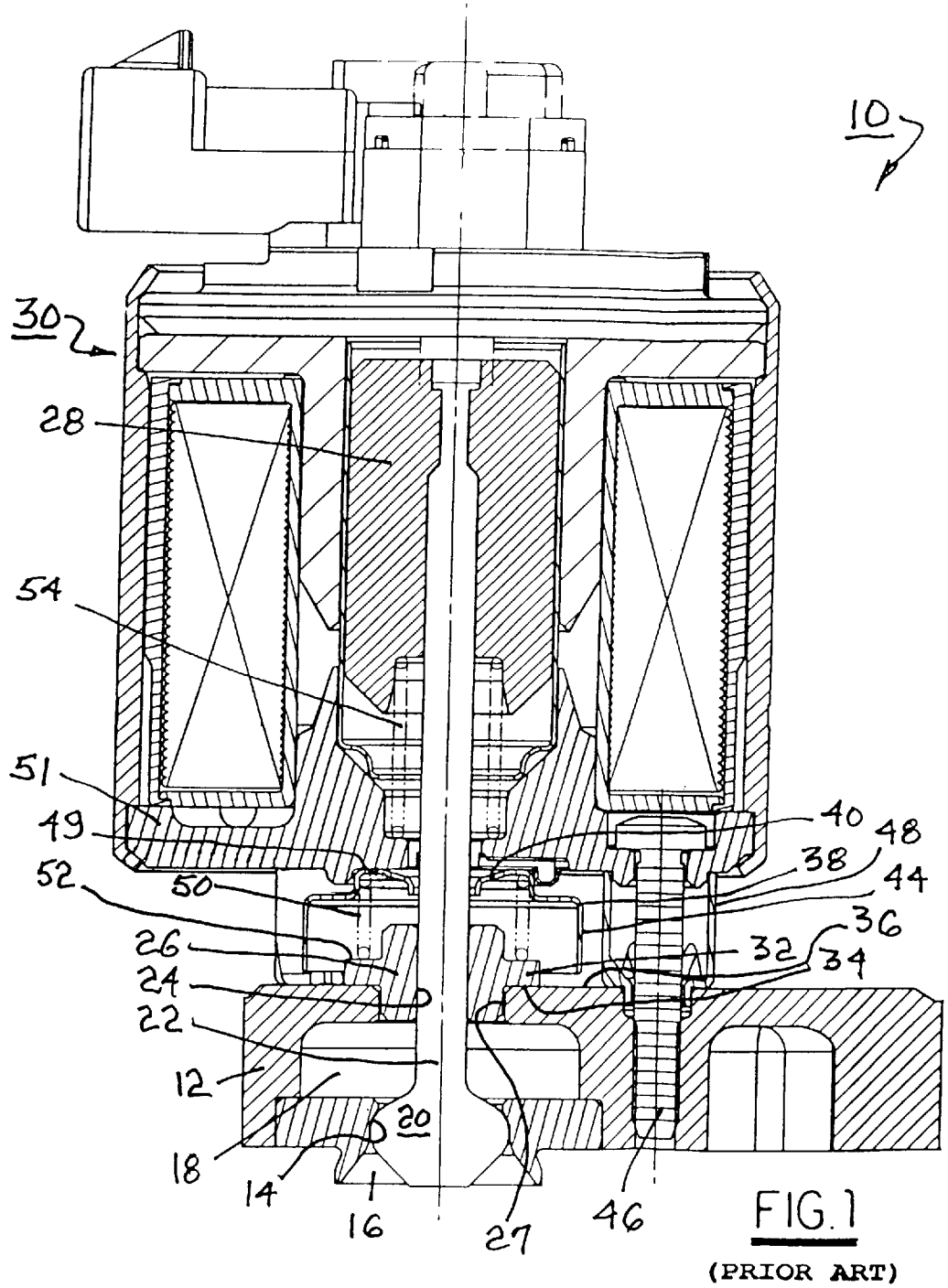
FIG. 1 is an elevational cross-sectional view of a prior art two-way pintle-type metering valve having a continuous pintle shaft extending into the actuator thereof, as may be used as an EGR valve in an internal combustion engine.

The benefits afforded by the present invention will become more readily apparent by first considering a prior art pintle valve. Referring to FIG. 1, a prior art two-way pintle valve assembly 10 includes a valve body 12 having a valve seat 14 separating a first chamber 16 from a second chamber 18, which chambers may communicate, for example, with the exhaust and intake systems, respectively, of an internal combustion engine (not shown) or the reverse. Valve head 20 is disposed adjacent to seat 14 for selectively mating therewith to open or to close communication between chambers 16 and 18. Valve pintle shaft 22 extends from head 20 through an axial bore 24 in bearing 26 and is captured within armature 28 of solenoid actuator 30. Bearing 26 is disposed in a port 27 in a wall of valve body 12 and guides shaft 22 in reciprocating motion to open and close the valve when actuator 30 is energized and de-energized, respectively.

Bearing 26 is provided with a circumferential flange 32 having an axial face 34 for sealing against axial outer surface 36 of valve body 12 to prevent leakage of gases therebetween. A cup-shaped bearing splash shield 38 has an inward-extending flange 40 with a central aperture for passage of shaft 22, preferably without contact therebetween, and a cylindrical skirt 44 extending axially to shield a substantial portion of bearing 26 from external contaminants. Shield 38 is open in a downwards direction to permit venting to the atmosphere of gases which may leak along bore 24 during operation of the valve. Actuator 30 is connected to valve body 12 via a plurality of bolts 46 extending through a plurality of standoffs 48. A coil spring 50 surrounding pintle shaft 22 is disposed within shield 38, being compressed between actuator 30 and a second surface 52 on flange 32 for urging flange 32 to seal against surface 36 under all operating conditions. Spring 50 also serves to urge shield 38 against surface 49 of primary polepiece 51 of actuator 30 to inhibit dust intrusion into the actuator.

A second spring 54 disposed in compression within actuator 30 between armature 28 and polepiece 51 keeps valve 10 in the normally-closed position shown in FIG. 1 when the solenoid is de-energized, pintle shaft 22 thus being under tension. When the valve is opened, by energizing of the actuator, pintle shaft 22 is subjected to compressive force, an important consideration in providing an interrupted pintle shaft and gas leakage containment system in accordance with the invention.

It will be readily seen that the surface of pintle shaft 22 is continuous from head 20 all the way into the center of armature 28, providing a direct and continuous pathway for moisture and/or gases to leak from chamber 18 in valve body 12 along pintle shaft 22 into the interior of actuator 30. This feature represents an important shortcoming of prior art valve assembly 10 which is overcome by the present invention.

Prior art leakage control efforts have been directed to stopping leakage along bore 24, principally by making the diametral clearance between the diameter of bore 24 and pintle shaft 22 as small as possible without inhibiting the smooth sliding action of the pintle in the bore. In arriving at the present invention, the inventors recognize that such leakage cannot ever be completely eliminated as long as there exists an unbroken pathway and a pressure drop along bore 24. Therefore, the present invention is directed to means for breaking the pathway and containing leakage which inevitably must occur along bore 24 until the pressure drop between chamber 18 and the outer end of bore 24 is zero. A further disadvantage of prior art valve assemblies having a continuous pintle shaft is that all valve elements intended to be coaxially aligned must be manufactured and assembled to very tight tolerances to avoid introduction of unwanted radial forces on pintle shaft 22 resulting from misalignment. Such forces place parasitic and detrimental loads on the actuator.

Figure 2:
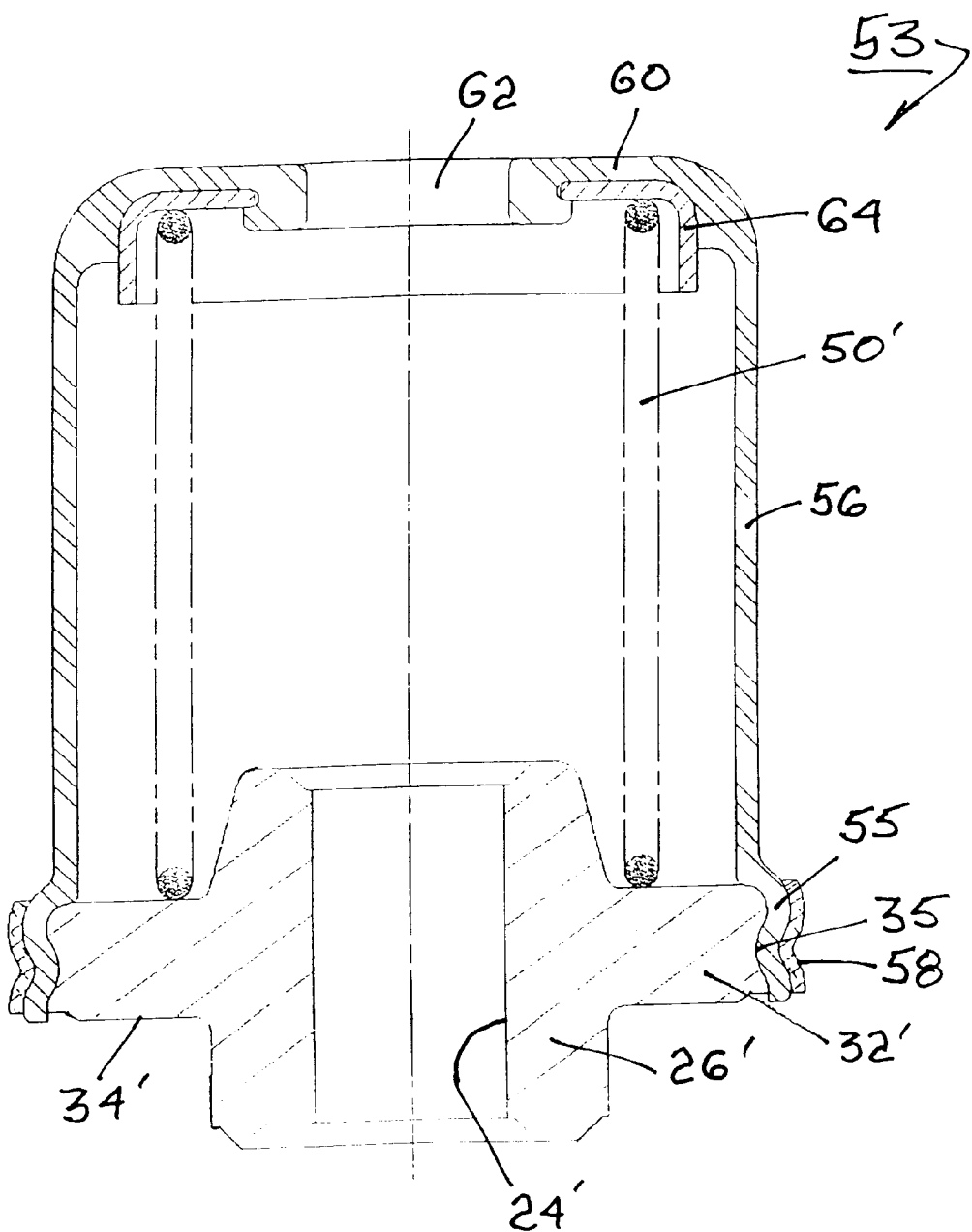
FIG. 2 is an elevational cross-sectional view of a first embodiment of a sealed gas leakage control system in accordance with the invention, for installation in a pintle shaft valve assembly having an interrupted pintle shaft.

Referring to FIG. 2, a first embodiment 53 of a containment system in accordance with the invention is shown, including a bearing 26' having an axial bore 24' for guiding and radially supporting a pintle shaft (not shown) in reciprocating motion through bearing 26', as described below. Bearing 26' is provided with a circumferential flange 32' having a first axial face 34' for sealing against an axial outer surface of a valve body to prevent leakage of gases therebetween, bearing 26' being disposable in a bore in a valve body as described below, similar to the manner in which prior art bearing 26 is disposed in valve body 12. Bearing 26' is provided with means, such as an equatorial groove 35 in flange 32' for retaining the skirt 55 of a cup-shaped elastomeric boot 56 radially compressed into and retained in groove 35 by a clamp 58. Preferably, clamp 58 comprises a continuous cylindrical metal ring which is permanently compressed into groove 35 as by swaging or, preferably, by magneforming. Thus, skirt 55 is impermeably sealed against bearing 26'. Boot 56 further comprises a necked portion 60 having an axial opening 62 for receiving a pintle shaft as described below. Preferably, captured within boot 56 is a formed supporting ring 64 for receiving a coil spring 50' disposed in compression between ring 64 and flange 32'.

Figure 3:
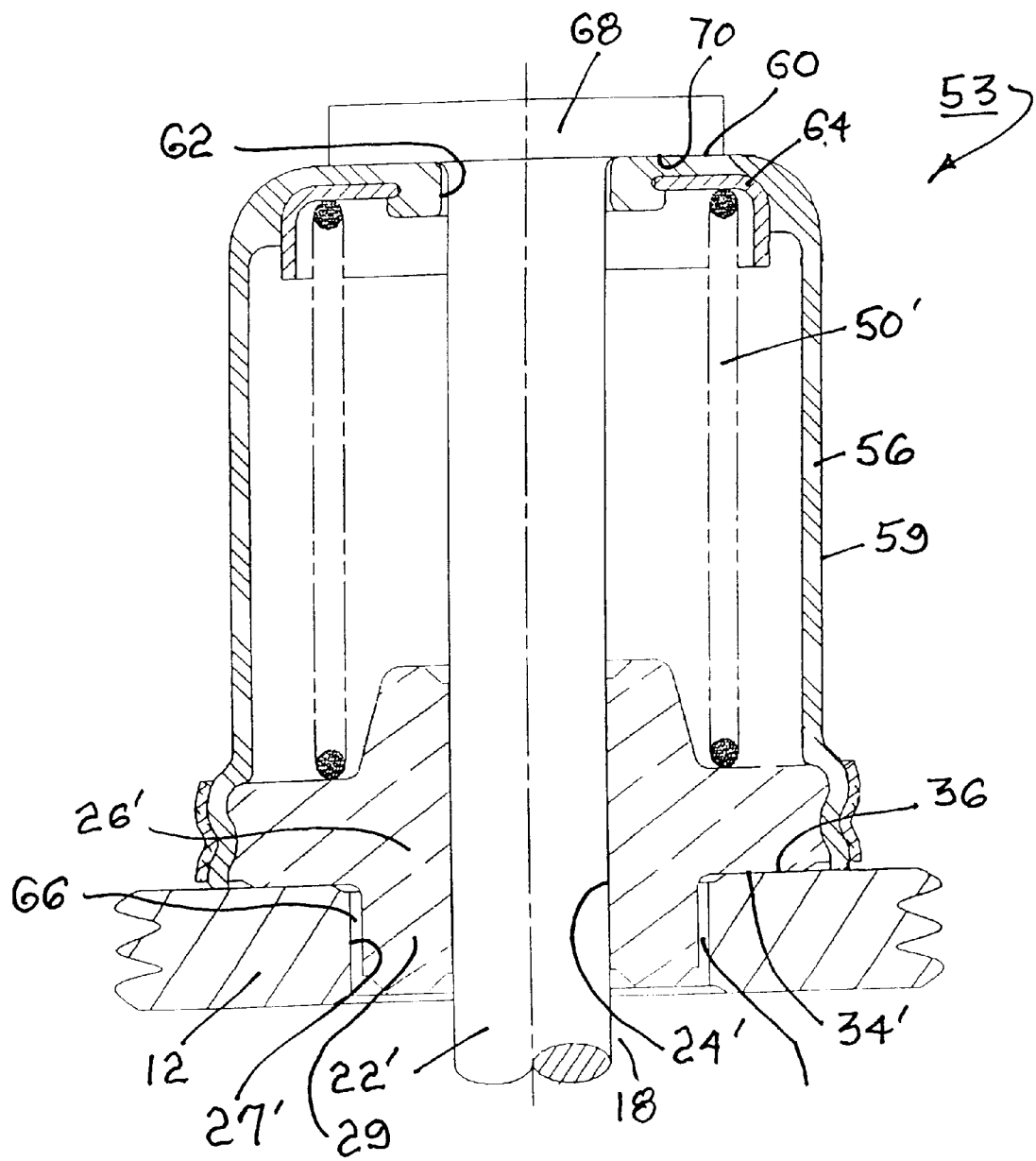
FIG. 3 is an elevational cross-sectional view of the system shown in FIG. 2, shown as mounted onto an interrupted pintle shaft.

Referring to FIG. 3, containment system 53 is disposed in axial bore 27' in a valve body 12 such that axial face 34' of flange 32' is sealingly mated against valve surface 36. Preferably, the diameter of bore 27' is slightly greater than the diameter of bearing portion 29 disposed in bore 27' such that a cylindrical gap 66 is formed therebetween. Gap 66 permits bearing 26' to be radially compliant to accommodate small axial misalignments of valve components, thereby relaxing the manufacturing and assembly tolerances thereof. A modified pintle shaft 22' is axially disposed in bore 24' and axial opening 62 and terminates outside boot 56 in a flat-headed flange 68 having a planar underside 70 against which necked portion 60 of boot 56 is sealingly urged by ring 64 and compressed spring 50'. Thus, any gas or moisture leakage along bore 24' from chamber 18 in valve body 12 is captured within boot 56 and cannot escape.

In operation, pintle shaft 22' is axially and reversibly reciprocated by an actuator (not shown but described below) through bore 24' in bearing 26' in opposition to bias spring 50'. As spring 50' is further compressed, elastomeric boot 56 is similarly and reversibly compressed by flange 68, the sidewalls 59 resiliently being reversibly collapsed.

Figure 4:
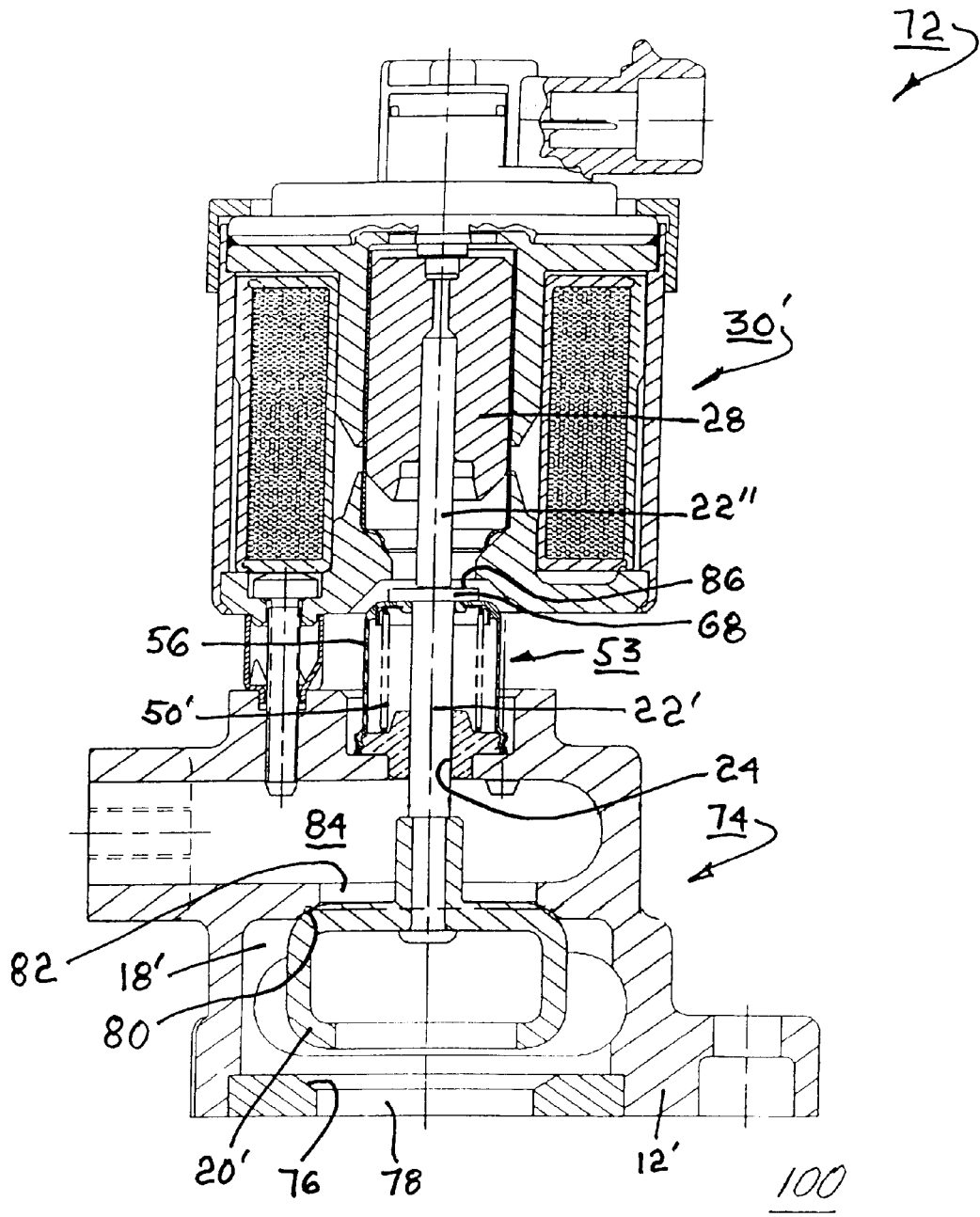
FIG. 4 is an elevational cross-sectional view showing the system shown in FIG. 2 as mounted in FIG. 3 installed in a three-way valve connected to an actuator as may be used as a reformate control valve in a fuel cell.

Referring to FIG. 4, a three-way metering diverter valve assembly 72 includes a three-way diverter valve 74, leakage containment system 53, and a modified solenoid actuator 30'. Valve body 12' includes a central chamber 18' containing valve head 20' in disposed to matingly seal against either first seat 76 leading to first port 78 or second seat 80 leading via second port 82 to a second chamber 84. Compressed spring 50' biases head 20' toward closure against second seat 80.

Modified actuator 30' includes a stub pintle shaft 22" disposed axially within armature 28 and engaged against the upper surface 86 of flange 68 for actuating pintle shaft 22' against bias spring 50' to vary the position of head 20' within chamber 18' thereby meteringly varying the volumes of gas flow across seats 76 and 80. Because valve head 20' is urged towards the closed valve position by spring 50', armature 28 and stub shaft 22" act on pintle shaft 22' only under compression. Because flat-headed flange 68 presents a relatively broad contact surface for stub shaft 22", the axial alignment of actuator 30' with valve 74 is significantly relaxed over the tight tolerance required in prior art valve 10.

As seen clearly in FIG. 4, shaft leakage along bore 24' is entirely contained within containment system 53 and can escape to neither armature 30' or the ambient atmosphere outside system 53. In operation, gas and/or moisture can leak along bore 24' in response to a pressure difference between opposite ends of bore 24' until sufficient pressure builds up within boot 56 to stop further leakage. Thus, boot 56 is required to be able to withstand the range of operating pressures to be encountered within valve 74, plus a small margin to allow for compression of the volume of boot 56 during actuation of the valve. Accordingly, boot 56 may be formed of any of various well-known durable elastomers and may, for example, be fiber-reinforced for high-pressure applications.

The boot portion of a containment system in accordance with the invention may take various forms within the scope of the invention.

Figure 5:
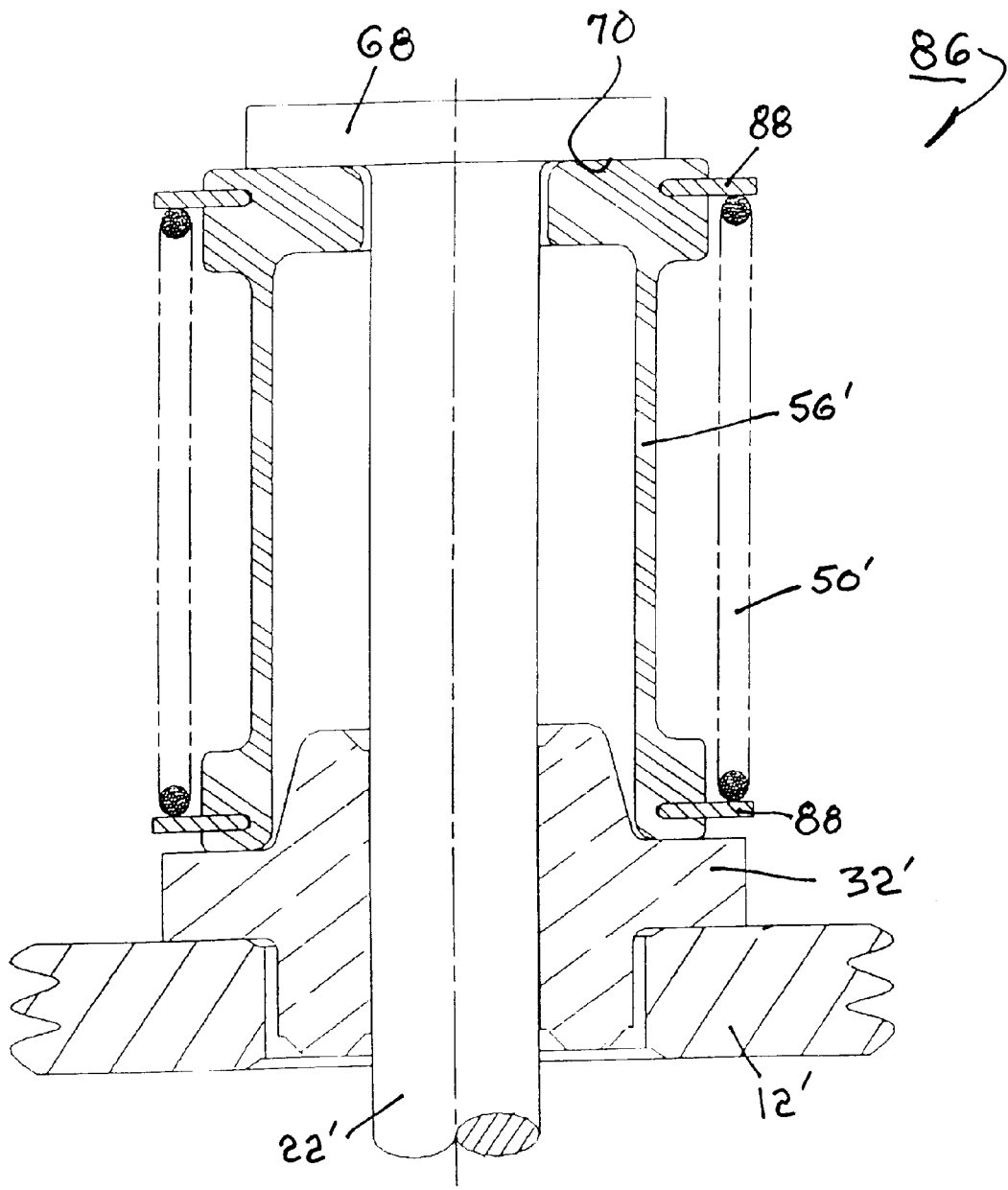
FIG. 5 is a second embodiment of a sealed gas leakage control system.

Referring to FIG. 5, a second embodiment 86 of a containment system includes a generally cylindrical boot 56' disposed within spring 50' which is compressedly retained between upper and lower retaining rings 88 disposed in annular slots in boot 56'. Boot 56' is thus sealingly urged by spring 50' against both pintle flange underside 70 and bearing flange 32', obviating the need for groove 35 and clamp 58 as in system 53.

Figure 6:
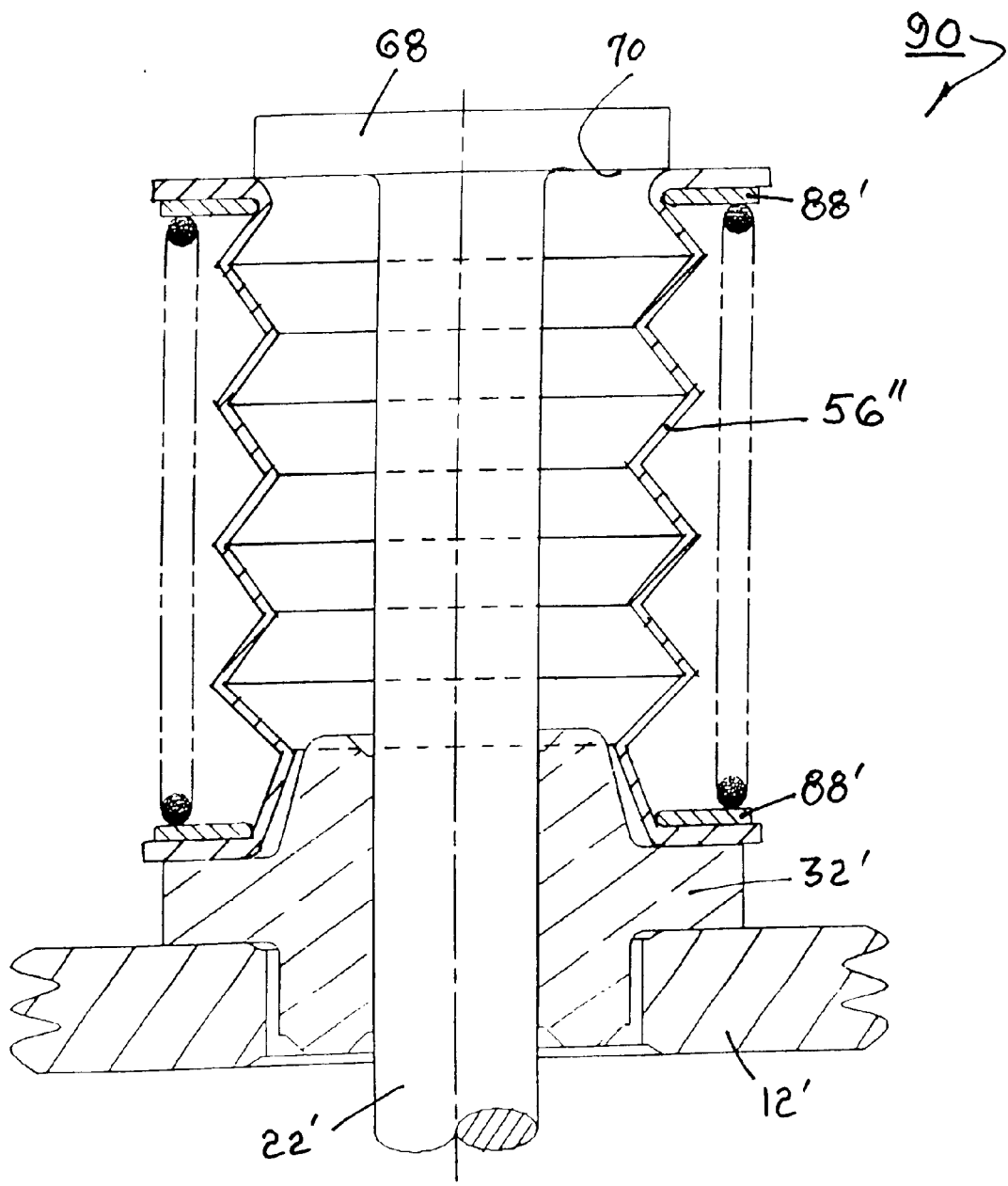
FIG. 6 is a third embodiment of a sealed gas leakage control system.

Referring to FIG. 6, a third embodiment 90 of a containment system includes a folded diaphragm or bellows 56" as the containment element, captured between upper and lower retaining rings 88'. Diaphragm 56" may be formed of a polymer which may be an elastomer, or of folded metal, for example, titanium, in known fashion.

A functional element common to all the embodiments shown in that each is capable of maintaining a sealed space below flange 68 while being deformed by the action of pintle shaft 22' without creating significant frictional or other loads on actuator 30'. This is an important consideration in providing a sealing system which is retrofittable to existing designs and which requires no increase in actuator size or power over present actuators.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. A shaft leakage containment system for a gas control valve, comprising:
   a) a pintle shaft bearing having an axial bore for guiding and radially supporting a pintle shaft;
   b) an impermeable gas containment element sealingly attached at a first end thereof to said bearing and having an axial opening at a second end thereof for receiving the pintle shaft; and
   c) a coil spring disposed within said containment element for urging said containment element into sealing relationship with the pintle shaft.

2. A system in accordance with claim 1 wherein said spring is in compression.

3. A system in accordance with claim 1 wherein said element is selected from the group consisting of elastomeric boot, polymeric boot, and folded diaphragm.

4. In a gas management pintle valve having a valve body and an actuator attached to the valve body, apparatus for containing gas leakage from the valve body along a pintle shaft, comprising:
   a) an interrupted pintle shaft extending from a bearing towards said actuator and terminating at an end outside of said actuator, said bearing being sealingly disposed in said valve body;
   b) a gas leakage containment system disposed on said interrupted pintle shaft, said system including
      said bearing and an impermeable gas containment element sealingly attached at a first end thereof to said bearing and sealingly attached at a second end thereof to said interrupted pintle shaft; and
   c) a stub pintle shaft disposed within and extending from said actuator and axially operative by said actuator against said end of said interrupted pintle shaft to axially displace said interrupted pintle shaft.

5. Apparatus in accordance with claim 1 wherein said gas leakage containment system further comprises a coil spring disposed within said containment element for urging said containment element into sealing relationship with said interrupted pintle shaft.

6. An exhaust gas recirculation pintle-type valve in an internal combustion engine, comprising a shaft leakage containment system including a pintle shaft bearing having an axial bore for guiding and radially supporting a pintle shaft and an impermeable gas containment element sealingly attached at a first end thereof to said bearing and having -an axial opening at a second end thereof for receiving the pintle shaft, and a coil spring disposed within said containment element for urging said containment element into sealing relationship with the pintle shaft.

7. A diverter valve for controlling flow of reformate in a fuel cell, comprising a shaft leakage containment system including a pintle shaft bearing having an axial bore for guiding and radially supporting a pintle shaft and an impermeable gas containment element sealingly attached at a first end thereof to said bearing and having an axial opening at a second end thereof for receiving the pintle shaft, and a coil spring disposed within said containment element for urging said containment element into sealing relationship with the pintle shaft.

8. A shaft leakage containment system for a gas control valve, comprising:
   a) a pintle shaft bearing having an axial bore for guiding and radially supporting a pintle shaft;
   b) an impermeable gas containment element having a first axial opening at a first end thereof for receiving said bearing and a second axial opening at a second end thereof for receiving the pintle shaft; and
   c) a coil spring disposed around said containment element for urging said containment element into sealing relationship with the bearing and the pintle shaft.

* * * * *